(12) United States Patent
Byrne et al.

(10) Patent No.: US 10,008,850 B2
(45) Date of Patent: Jun. 26, 2018

(54) ELECTRICAL POWER INFEED SYSTEM

(71) Applicants: Norman R. Byrne, Ada, MI (US);
Roger D. Burdi, Grand Rapids, MI (US); Timothy J. Warwick, Sparta, MI (US)

(72) Inventors: Norman R. Byrne, Ada, MI (US);
Roger D. Burdi, Grand Rapids, MI (US); Timothy J. Warwick, Sparta, MI (US)

(*) Notice: Subject to any disclaimer, the term of this patent is extended or adjusted under 35 U.S.C. 154(b) by 299 days.

(21) Appl. No.: 14/636,273

(22) Filed: Mar. 3, 2015

(65) Prior Publication Data

US 2015/0255981 A1    Sep. 10, 2015

Related U.S. Application Data

(60) Provisional application No. 61/947,646, filed on Mar. 4, 2014.

(51) Int. Cl.
| | | |
|---|---|---|
| *H02J 9/00* | (2006.01) | |
| *H02J 3/00* | (2006.01) | |
| *H02G 3/00* | (2006.01) | |
| *H01R 25/16* | (2006.01) | |

(52) U.S. Cl.
CPC ............. *H02J 3/00* (2013.01); *H02G 3/00* (2013.01); *H01R 25/168* (2013.01); *Y10T 307/832* (2015.04)

(58) Field of Classification Search
CPC .... H02J 9/062; H02J 9/061; H02J 9/06; H02J 9/08; H01H 2300/018

USPC ................................................. 307/64, 126
See application file for complete search history.

(56) References Cited

U.S. PATENT DOCUMENTS

| | | |
|---|---|---|
| 3,944,891 A | 3/1976 | McDonald et al. |
| 4,399,371 A | 8/1983 | Ziff et al. |
| 4,462,656 A | 7/1984 | Beyer |
| 4,706,159 A | 11/1987 | Hafner |
| 4,757,416 A | 7/1988 | Wilkerson |
| 4,985,806 A | 1/1991 | Mazzullo et al. |
| 5,157,273 A | 10/1992 | Medendorp et al. |
| 5,302,857 A | 4/1994 | Charles et al. |
| 6,330,176 B1 * | 12/2001 | Thrap ............... H02J 3/005 307/86 |
| 6,741,442 B1 | 5/2004 | McNally et al. |
| 6,768,225 B2 | 7/2004 | Chang et al. |

(Continued)

*Primary Examiner* — Quan Tra
(74) *Attorney, Agent, or Firm* — Gardner, Linn, Burkhart & Ondersma LLP

(57) ABSTRACT

An electrical power infeed module for modular electrical power systems selectively provides power to one or more electrical outlets in the system from a single power source, regardless of the number of power sources are engaged by power infeed modules in the system. The power infeed module includes a power infeed cable, a power output cable, and an electrical circuit disposed between the power infeed cable and the power output cable, the electrical circuit being operable to selectively connect the power output cable to the power infeed cable if the power infeed cable is connected to a first power source and the power output cable is not already electrically energized by a second power source. The circuit includes an electrical switch, a sensor for detecting whether the power output cable is electrically energized, and a controller for operating the switch in response to a signal from the sensor.

20 Claims, 5 Drawing Sheets

(56) References Cited

U.S. PATENT DOCUMENTS

| | | |
|---|---|---|
| 7,099,966 B2 | 8/2006 | Chan et al. |
| 7,129,599 B2 | 10/2006 | Divan et al. |
| 7,141,891 B2 | 11/2006 | McNally et al. |
| 7,259,950 B2 | 8/2007 | Chen |
| 7,262,943 B2 | 8/2007 | Stellato et al. |
| 7,528,504 B2 | 5/2009 | Gerber |
| 7,602,083 B1 | 10/2009 | Flegel et al. |
| 7,606,014 B2 | 10/2009 | Ziegler et al. |
| 7,619,868 B2 | 11/2009 | Spitaels et al. |
| 7,648,379 B2 | 1/2010 | Johnson et al. |
| 7,697,268 B2 | 4/2010 | Johnson et al. |
| 7,826,202 B2 | 11/2010 | Johnson et al. |
| 7,834,486 B1 | 11/2010 | Flegel et al. |
| 7,888,821 B2 | 2/2011 | Flegel et al. |
| 7,905,749 B2 | 3/2011 | Cleveland |
| 7,910,833 B2 | 3/2011 | McGinley et al. |
| 7,940,504 B2 | 5/2011 | Spitaels et al. |
| 7,960,648 B2 | 6/2011 | McGinley et al. |
| 7,973,425 B2 | 7/2011 | Chen |
| 7,982,335 B2 | 7/2011 | Aldag et al. |
| 8,004,115 B2 | 8/2011 | Chapel et al. |
| 8,138,626 B2 | 3/2012 | Jonsson et al. |
| 8,172,588 B2 | 5/2012 | Johnson et al. |
| 8,172,589 B2 | 5/2012 | Johnson et al. |
| 8,174,149 B2 | 5/2012 | Chapel et al. |
| 8,207,627 B2 | 6/2012 | Aldag et al. |
| 8,242,359 B2 | 8/2012 | McGinley et al. |
| 8,305,737 B2 | 11/2012 | Ewing et al. |
| 8,335,936 B2 | 12/2012 | Jonsson et al. |
| 8,350,406 B2 | 1/2013 | Byrne et al. |
| 8,374,729 B2 | 2/2013 | Chapel et al. |
| 8,415,826 B2 | 4/2013 | Lee |
| 8,503,149 B2 | 8/2013 | Spitaels et al. |
| 8,558,408 B2 * | 10/2013 | Carter ............... H02J 9/06 307/43 |
| 8,604,914 B2 | 12/2013 | Clarke |
| 8,680,709 B2 | 3/2014 | Byrne et al. |
| 8,716,885 B2 | 5/2014 | Pfitzer et al. |
| 8,907,520 B2 | 12/2014 | Chapel et al. |
| 9,166,308 B2 * | 10/2015 | Byrne ............... H01R 25/00 |
| 2004/0130213 A1 | 7/2004 | Goldsholl |
| 2005/0073199 A1 * | 4/2005 | Jenkin ............... H02J 3/06 307/38 |
| 2006/0194467 A1 | 8/2006 | Beasley et al. |
| 2009/0295233 A1 | 12/2009 | McGinley et al. |
| 2011/0029145 A1 | 2/2011 | Dong |
| 2011/0077788 A1 | 5/2011 | Chan et al. |
| 2011/0260538 A1 | 10/2011 | Huang |
| 2011/0260555 A1 | 10/2011 | McGinley et al. |
| 2012/0095610 A1 | 4/2012 | Chapel et al. |
| 2012/0293161 A1 * | 11/2012 | Zhang ............... G01R 19/1659 324/119 |
| 2013/0093249 A1 | 4/2013 | Chapel et al. |
| 2013/0099567 A1 | 4/2013 | Pfitzer |

\* cited by examiner

ELECTRICAL POWER INFEED SYSTEM

CROSS REFERENCE TO RELATED APPLICATION

The present application claims the benefit of U.S. provisional application Ser. No. 61/947,646, filed Mar. 4, 2014, which is hereby incorporated by reference in its entirety.

FIELD OF THE INVENTION

The present invention relates to electrical power systems for providing users with access to electrical power within a work area, and more particularly, to electrical systems that can be ganged together in different ways to provide readily reconfigurable electrical power arrangements.

BACKGROUND OF THE INVENTION

Electrical power receptacles may be incorporated into modular electrical systems that can be coupled together in a series or ganged arrangement to provide users with access to electrical power at different locations within a work area, such as in locations that are spaced from conventional wall, floor, or ceiling outlets. However, electrical power receptacles that are located remotely from walls, floors, or ceilings must be connected to a power source, such as a conventional wall or floor outlet, which creates a risk that different modules having their own dedicated power cords could be coupled to different power sources, and also coupled to one another. This can cause electrical problems ranging from out-of-phase electrical sources being electrically coupled together, to permitting excessive electrical loads to be powered without tripping a circuit breaker.

SUMMARY OF THE INVENTION

The present invention provides an intelligent electrical power infeed system as part of a modular electrical power system for use in a work area, such as in an office, a home, a hotel, an airport, or the like. The intelligent electrical power infeed system includes a circuit that maintains power sources, such as wall or floor outlets, in isolation from the modular electrical power system until it is established that the modular electrical power system is not already being supplied with electrical power from another source. This enhances the ability of work area users to reconfigure movable furniture or other articles as desired, including the ganging or daisy-chaining of multiple modular electrical power systems in series and/or in parallel, without relying on skilled electrical technicians or personnel to ensure that proper electrical connections are being made.

According to one form of the present invention, an electrical power infeed system or module is provided for selectively supplying electrical power to an electrical power system in a work area, and includes a power infeed cable, a power output cable, and an electrical circuit that selectively establishes continuity between the power infeed and output cables. The power infeed cable has at least two AC infeed conductors that are configured to be electrically coupled to a first electrical power source. The power output cable has at least two AC output conductors that are in selective electrical communication with the AC infeed conductors of the power infeed cable, as controlled by the electrical circuit, which is disposed between the power infeed cable and the power output cable. The electrical circuit includes a switch, a sensor, and a controller, where the switch is configured to selectively establish an electrical connection between at least one of the AC infeed conductors of the power infeed cable and at least one of the AC output conductors the power output cable, and which may default to an open-circuit condition. The sensor detects whether the power output cable is electrically energized, and the controller is operable to close the switch in response to a signal received from the sensor indicating that the power output cable is not energized. The power infeed module is thus operable to (i) electrically isolate the power infeed cable from the power output cable when the power output cable is already electrically energized by a second electrical power source before the power infeed cable is electrically energized by the first electrical power source, and (ii) electrically couple the power infeed cable to the power output cable via the switch when the power output cable is not already electrically energized when the power infeed cable is electrically energized by the first electrical power source.

In one aspect, the switch of the electrical power infeed system is a dual-pole relay. Optionally, the switch includes a pair of single-pole relays.

In another aspect, the electrical circuit includes at least one optical isolator associated with the sensor. The optical isolator electrically isolates the controller from the power output cable. Optionally, the electrical circuit includes a second optical isolator associated with the switch, to electrically isolate the controller from the power infeed cable.

Thus, the modular electrical power system with intelligent electrical power infeed of the present invention provides users of a work area with access to electrical power at different locations within the area, and allows the area to be reconfigured according to the desired types and locations of furniture or other articles that support or incorporate the electrical power systems, but without creating the potential for electrical problems that could otherwise result from simultaneously electrically coupling an electrical system to multiple power sources. This permits users of the work area, including those with little or no special knowledge of electrical systems, to reconfigure the modular electrical system as desired, and to couple multiple power infeeds to the modular electrical system (whether intentionally or not) without creating a risk of electrical problems due to the chosen configuration.

These and other objects, advantages, purposes and features of the present invention will become apparent upon review of the following specification in conjunction with the drawings.

DESCRIPTION OF THE PREFERRED EMBODIMENTS

Figure 1:
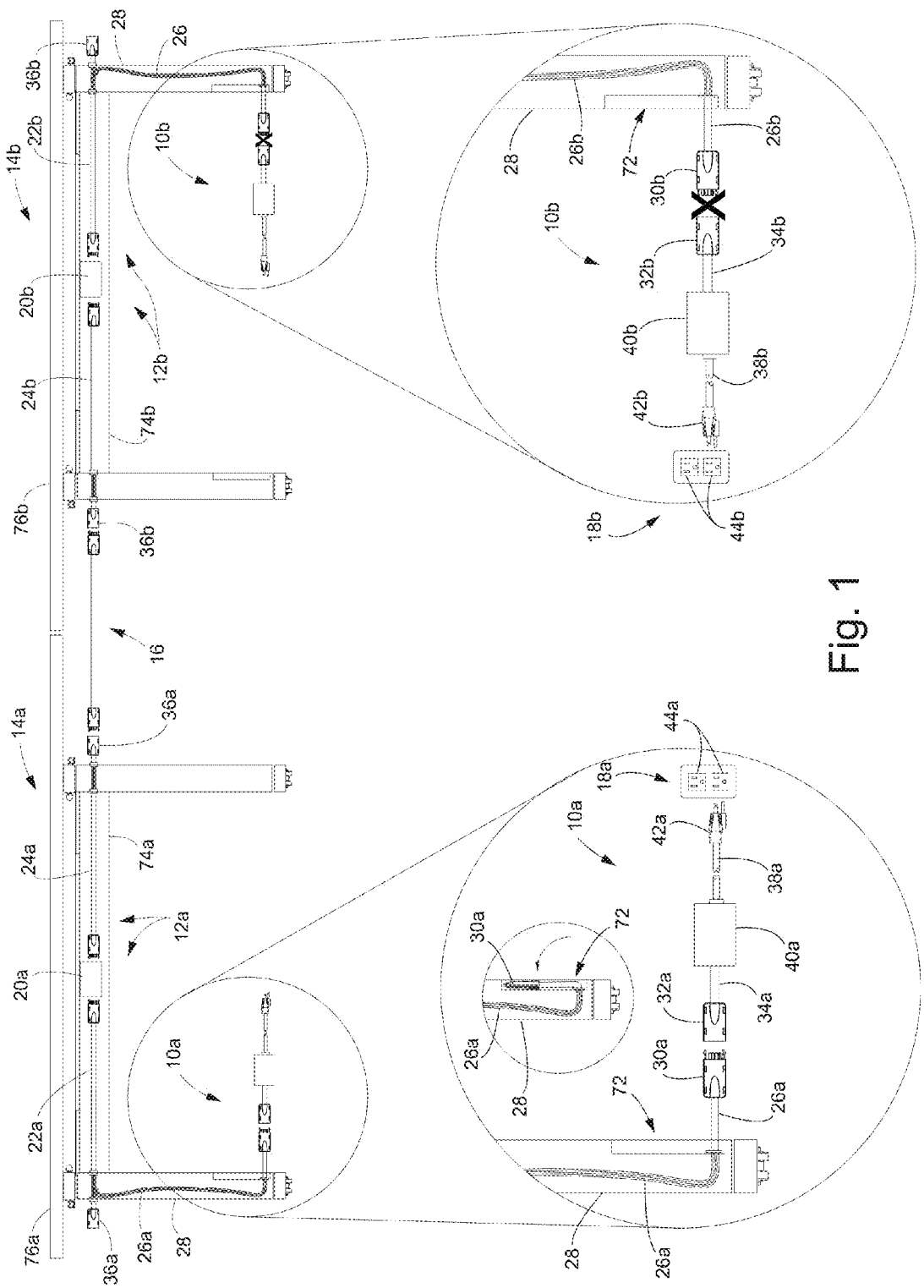
FIG. 1 is a diagrammatic side elevation of a pair of portable tables incorporating modular power systems with respective power infeed systems in accordance with the present invention, including enlarged views of portions thereof.

An intelligent electrical power infeed system facilitates the placement and relocation of electrical receptacles and/or devices within a work area, while reducing or substantially eliminating the risks associated with the possibility of coupling multiple power cords of a given modular power system to different power sources. Referring now to the drawings and the illustrative embodiments depicted therein, a pair of electrical power infeed systems 10a, 10b are arranged for supplying power to one or both modular power systems 12a, 12b (FIG. 1). In the illustrated embodiment of FIG. 1, each modular power system 12a, 12b is incorporated into a movable table 14a, 14b, which can be repositioned around a work area, and can be repositioned relative to other tables. Two or more tables 14a, 14b may be positioned near or adjacent one another, such as shown in FIG. 1, with their respective modular power systems 12a, 12b electrically coupled together via a jumper cable 16, so that the modular power system associated with one table may be electrically energized by the modular power system (and electrical power infeed system) of another table. However, as will be described in detail below, if a user were to couple the electrical power infeed systems 10a, 10b to respective different power sources such as first and second wall-mounted electrical receptacles 18a, 18b, then only one of the electrical power infeed systems 10a, 10b would permit itself to supply electrical power to the modular power systems of both tables.

Each modular power system 12a, 12b includes a respective electrical power outlet unit 20a, 20b, which receives power from a respective modular input wire 22a, 22b, and conveys power to a modular output wire 24a, 24b. It will be appreciated that the terms "input" and "output", as well as "upstream" and/or "downstream", are relative terms that are used herein to distinguish the relative locations of the wiring or other components for a given modular power system 12a, 12b, and that electrical power may actually flow through the described wiring and connectors in either direction, depending on the arrangement of one modular power system relative to another. A branch wire 26a, 26b is in electrical communication with a respective modular input wire 22a, 22b, and drops down from the modular input wire along a leg 28 of the respective table 14a, 14b, such as shown in FIG. 1. Branch wires 26a, 26b terminate in respective branch wire connectors 30a, 30b, which are configured to releasably couple to respective power output connectors 32a, 32b of power infeed cables 34a, 34b of each electrical power infeed system 10a, 10b. Each modular power system 12a, 12b further includes a pair of modular power in/out connectors 36a, 36b, each in electrical communication with one of the modular input wires 22a, 22b or the modular output wires 24a, 24b. Thus, substantially any number of tables (or other furnishings or movable articles) and their respective modular power systems 12a, 12b may be ganged or daisy-chained together using additional jumpers 16 between respective connectors as needed.

Figure 4:
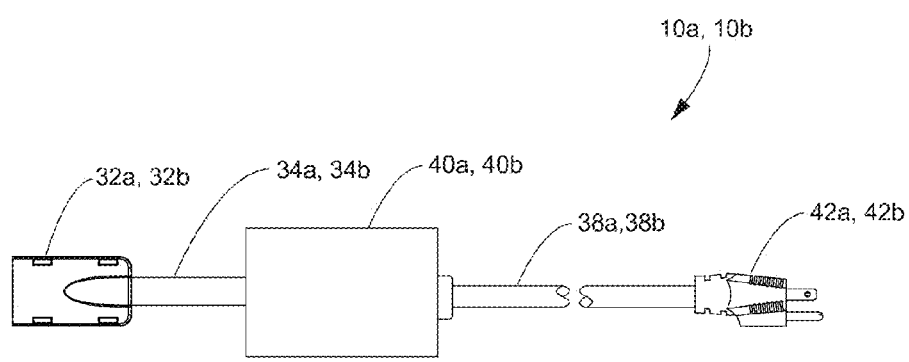
FIG. 4 is a side elevation of a plug-in modular power infeed system in accordance with the present invention.
Figure 5:
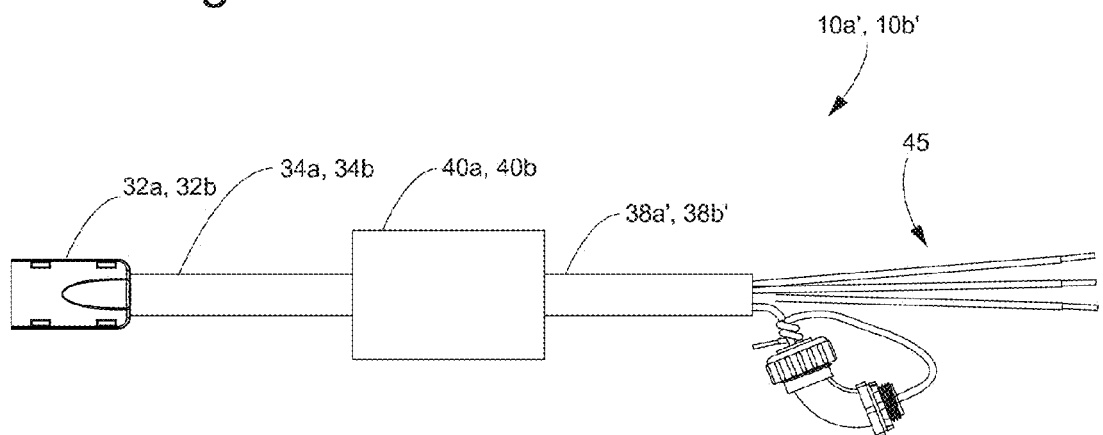
FIG. 5 is a side elevation of a hard-wired modular power infeed system in accordance with the present invention.

Electrical power infeed systems 10a, 10b may be identical or substantially identical to one another, and further include respective power infeed cables 38a, 38b and electrical circuit modules 40a, 40b (FIG. 1). Power infeed cables 38a, 38b typically terminate in conventional plugs 42a, 42b that are configured to be received in a respective socket 44a, 44b of one of the electrical power sources 18a, 18b, which will be understood to include conventional wall outlets, floor outlets, or the like. It will be appreciated that power infeed cables 38a, 38b and power output cables 34a, 34b may be substantially any desired length needed for coupling electrical power infeed system 10a, 10b to a respective electrical power source 18a, 18b, and that jumper cable 16 may be substantially any desired length needed for coupling together the modular electrical power systems 12a, 12b of adjacent tables 14a, 14b. Similarly, the lengths of other cables or wiring associated with modular power systems 12a, 12b may be varied to suit the dimension of the tables or other movable furnishings or articles in which the power systems are mounted or incorporated. Thus, the dimensions, numbers of outlets, types and numbers of connectors, or the use of hard-wired connections in place of releasable connectors, may be customized or changed as desired, without departing from the spirit and scope of the present invention. For example, an alternative electrical power infeed system 10a', 10b' (FIG. 5) may be substantially identical to the power infeed system 10a, 10b of FIGS. 1 and 4, except that power infeed cables 38a', 38b' terminate in bare wires 45 for hard-wiring to an electrical power source.

Each electrical circuit module 40a, 40b is operable to detect whether its respective power output cable 34a, 34b is electrically energized when plug 42a, 42b is connected to an energized socket or receptacle 44a, 44b, and will only couple power infeed cable 38a, 38b to power output cable 34a, 34b if electrical power is not already present at power output cable 34a, 34b from another source. Thus, when the first electrical circuit module 40a is electrically energized by the first electrical power source 18a, and the associated first modular power system 12a is not already electrically energized, first electrical circuit module 40a will electrically connect power infeed cable 38a to power output cable 34a to thereby energize first modular power system 12a with electrical power that is received from first electrical power source 18a. If the second movable table 14b is then moved into position where its modular power system 12b can be coupled to the first modular power system 12a via jumper cable 16, such as shown in FIG. 1, then second modular power system 12b will also be electrically energized by first electrical power source 18a, via first electrical circuit module 40a. However, because the second electrical power infeed system 10b is functionally the same as the first electrical power infeed system 10a, if second electrical plug 42b is subsequently coupled to the second electrical power source 18b, then second electrical circuit module 40b will not electrically couple second power infeed cable 38b to second power output cable 34b (symbolized with an X over branch wire connector 30b and power output connectors 32b, at right in FIG. 1) because second power output cable 34b is already electrically energized by the first electrical power source 18a sending power through first electrical power infeed system 10a, first modular power system 12a, second modular power system 12b, to second power output cable 34b.

Figure 3A:
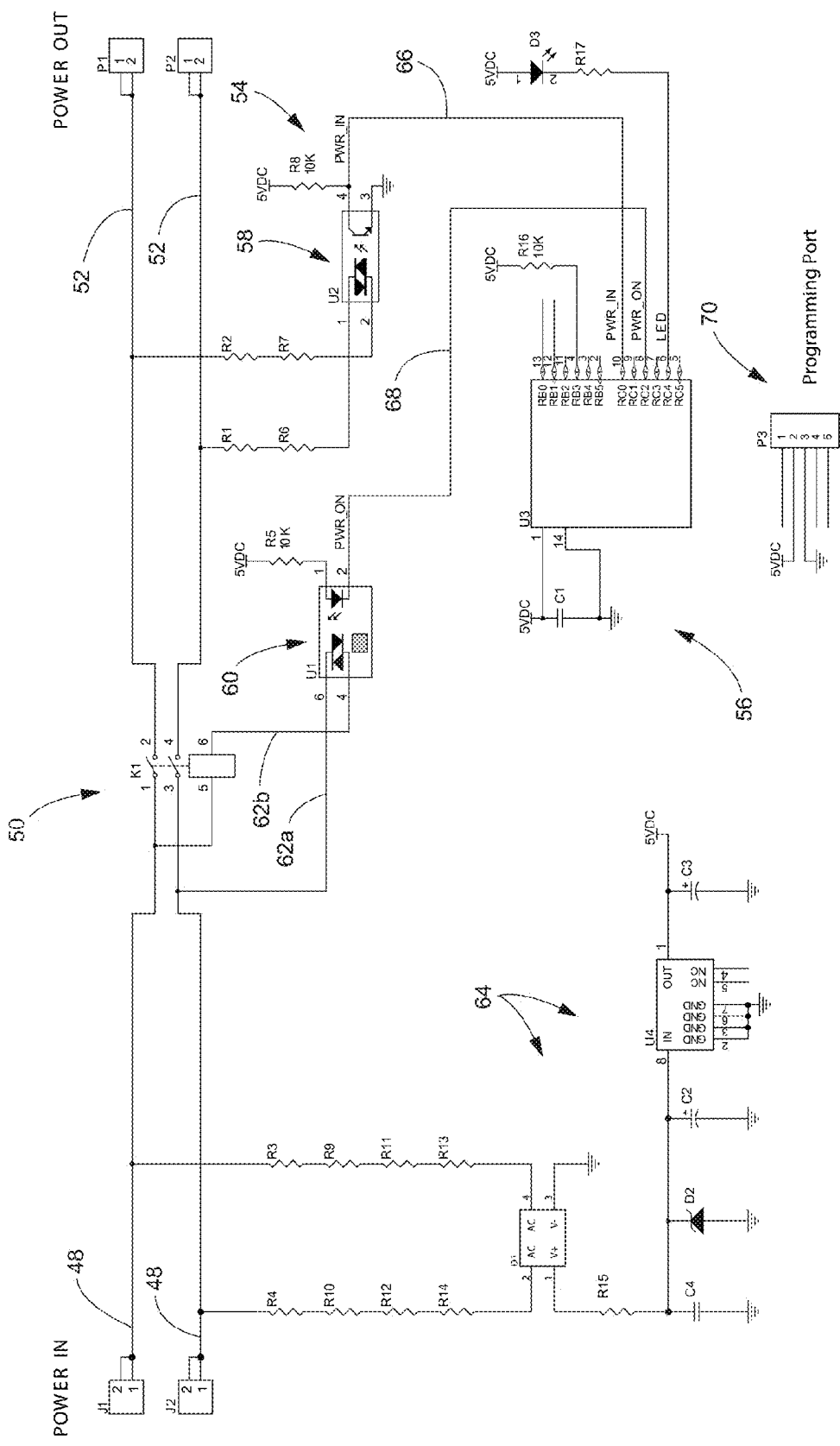
FIG. 3A is an electrical schematic of a power infeed system in accordance with the present invention.

Referring now to FIG. 3A, an electrical circuit 46 is incorporated in each electrical circuit module 40a, 40b, and includes a pair of power input conductors 48 in electrical communication with respective conductors of the power infeed cable 38a or 38b (not shown in FIG. 3A), an electrical switch 50 such as a heavy-duty two-pole relay (or two single-pole relays), a pair of power output conductors 52 that are in electrical communication with respective conductors of one of the power output cables 34a or 34b, a power sensor 54 coupled to power output conductors 52, and a logic controller 56 that is in communication with power sensor 54 and operable to selectively actuate relay 50, which defaults to an open condition as shown in FIG. 3A. Power sensor 54 is operable to generate an electronic signal, via an optical isolator 58, when electrical voltage is present at power output conductors 52. Another optical isolator 60 establishes continuity between a pair of relay input conductors 62a, 62b that power relay 50 to close its contacts and thereby establish continuity between power input conductors 48 and power output conductors 52. Optical isolators 58, 60 ensure that high voltage AC power cannot reach and potentially damage low voltage components of circuit 46, including logic controller 56, and to ensure that high voltage power at power input conductors 48 cannot find an alternate path to power output conductors 52, or vice versa, such as in the event of a failure condition. Circuit 46 further includes one or more rectifiers that convert available AC power to a lower voltage DC power output for use by power sensor 54, logic controller 56, an optional out-of-phase detector circuit 64 (described below), and the like.

As briefly described above, circuit 46 is operable to connect power from a second electrical power source 18b only if the corresponding modular power system(s) 12a, 12b are not already electrically energized by first electrical power source 18a, for vice versa. Referring to FIG. 3A, the electrical contacts of relay 50 default to an open condition with no continuity established between the respective power input conductors 48 and power output conductors 52. If power output conductors 52 are energized, then power sensor 54 will generate a signal (via optical isolator 58) indicative of that fact to logic controller 56 via a low voltage signal line 66. It will be appreciated that the absence of such signal may also be considered a "signal" to the logic controller 56, indicating that power output conductors 52 are not presently energized. When power input conductors 48 are electrically energized (by coupling the associated plug 42a or 42b to a wall outlet or other electrical power source), logic controller 56 determines whether power output conductors 52 are already energized, based on the signal received from power sensor 54, and if it is determined that power output conductors 52 are not energized, logic controller 56 energizes a low voltage signal line 68 to illuminate a lamp in optical isolator 60, thus establishing electrical continuity between relay input conductors 62a, 62b. Because relay input conductors 62a, 62b are in communication with respective ones of the power input conductors 48, their selective continuity at optical isolator 60 (when power output conductors 52 are not already energized) will energize and close double-pole relay 50 to thereby establish continuity between power input conductors 48 and power output conductors 52, thereby energizing power output conductors 52 and the downstream modular power system(s) 12a, 12b.

However, in the event that power output conductors 52 are already energized by a downstream power source, then power sensor 54 will indicate this to logic controller 56, which will not energize low voltage signal line 68 upon connection of power input conductors 48 to another power source, so that relay 50 remains open and only the downstream power source will be energizing the modular power system(s), despite the subsequent electrical connection to another power source. It will be appreciated that substantially any number of additional power sources may be coupled to power infeed cables associated with additional electrical power infeed systems, with the same result that only the first-connected electrical power infeed system will actually energize the modular power systems to which it is coupled.

Logic controllers 56 may be configured so that if the logic controller of first electrical power infeed system 10a is allowing power to be sent from first power source 18a to both first modular power system 12a and second modular power system 12b, with second electrical power infeed system 10b also plugged in to second power source 18b, and first plug 42a (of first infeed system 10a) is then unplugged from first power source 18a, the logic controller 56 of second electrical power infeed system 10b will not energize first and second modular power systems 12a, 12b unless the second electrical power infeed system 10b is first unplugged from second power source 18b for several seconds, and then plugged back in. This optional mode of operation ensures that the power systems 12a, 12b will be de-energized when a user unplugs the power cord associated with the active (energizing) power infeed system 10a from an outlet, such as when the user is planning to service the receptacles 20a or 20b at one of the tables, even the other power infeed system 10b is still coupled to a live outlet.

Logic controller 56 may also be configured to incorporate a random time-delay into the start sequence for actuating switch 50. One purpose for a time-day would be to avoid a double (or more) power source condition in the event that multiple power infeed systems 10a, 10b are coupled to respective power sources on the same circuit, if that circuit were to be de-energized and then re-energized, or if the power infeed systems were coupled to different circuits that were both de-energized and then simultaneously re-energized. Without a random time-delay, such an event could be more likely to result in all connected power infeed systems 10a, 10b starting and energizing their respective modular power systems 12a, 12b simultaneously.

The optional out-of-phase detector circuit 64 (FIG. 3A) compares the electrical phase at power input conductors 48 (which corresponds to the phase at first electrical power source 18a in FIG. 1) and the electrical phase at power output conductors 52 (which, if electrical current is present at conductors 52, would correspond to the phase at second electrical power source 18b in FIG. 1), and generates an optical or audible signal to indicate to users that an out-of-phase condition exists. It should be recalled that, for reasons explained above, relay 50 would remain open in this condition because power sensor 54 would have detected electrical power present at power output conductors 52 and would have signaled logic controller 56 of this condition, so that logic controller 56 would not illuminate optical isolator 60 and there would be no electrical continuity between relay input conductors 62a, 62b, thus leaving relay 50 open with no continuity between power input conductors 48 and power output conductors 52.

Notwithstanding the above description of the normal operation of circuit 46, out-of-phase detector circuit 64 may optionally be used, for example, to selectively establish electrical continuity between power input conductors 48 and power output conductors 52 once it is confirmed that the electrical power phase at the power input conductors 48 is the same as the electrical power phase at the power output conductors 52, essentially bypassing or overriding the power-detection logic described above under certain conditions. For example, it may be appropriate or permissible to accept two or more power sources for two or more modular power systems that are coupled together, if it is established that the two or more power sources are on the identical circuit. Out-of-phase detector circuit 64 may also permit the detection of a potentially unsafe condition in which two separate (i.e., not electrically coupled together by a jumper 16) modular power systems 12a, 12b are simultaneously energized by respective power sources 18a, 18b, and then a jumper 16 is used to couple the modular power systems 12a, 12b together while they are energized. If that were to occur, and if power sources 18a and 18b were out-of-phase from one another, the condition could be detected by the out-of-phase detector circuits 64 of each electrical power infeed system 10a, 10b and identified (by logic controller 56) as a criteria to trigger opening the switch or switches 50.

A programming port 70 may be used for programming logic controller 56 during the manufacturing thereof, to customize the criteria used by logic controller 56 to determine when it will signal relay 50 to close and thereby establish continuity between power input conductors 48 and power output conductors 52. For example, logic controller 56 may be programmed to close relay 50 only when power input conductors 48 are energized and power output conductors 52 are not energized, or logic controller 56 may be programmed to close relay 50 even if both the power input conductors 48 and power output conductors 52 are energized, as long as it has been established that the electrical phases are the same for both sets of conductors 48, 52 and/or if it is established that both sets of conductors are energized by the same circuit. Logic controller 56 may also be programmed to provide visual and/or audible indications for different operational modes or detected power conditions, as will be described below.

Figure 3B:
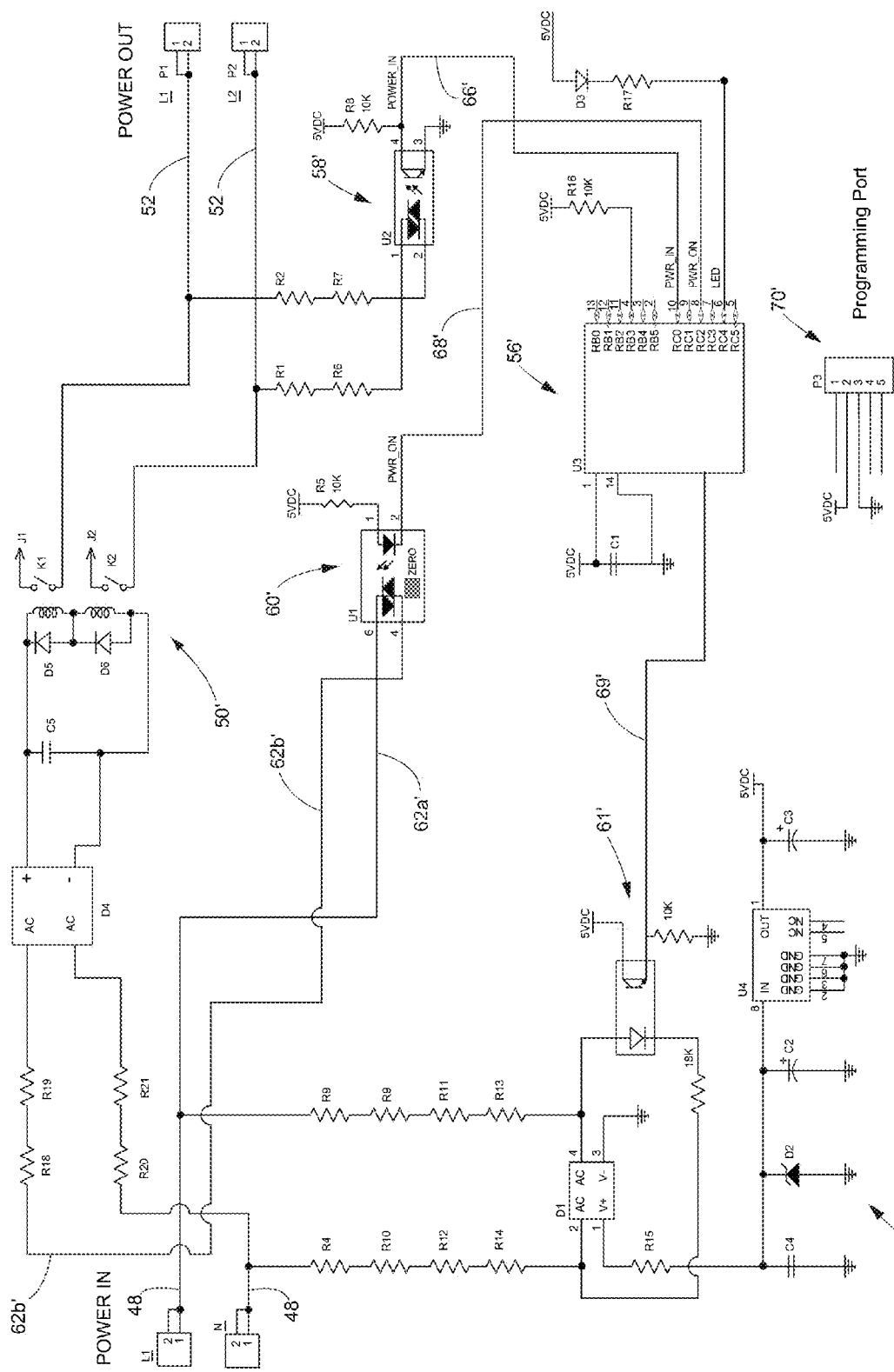
FIG. 3B is an electrical schematic of another power infeed system in accordance with the present invention.

Optionally, and with reference to FIG. 3B, an alternative electrical circuit 46' is functionally similar to the circuit 46 described above, but includes a more fully illustrated out-of-phase detector circuit 64' and an electrical switch 50' configured as two single-pole DC relays. In substantially all other respects, circuit 46' is the same or similar to the circuit 46 of FIG. 3A, such that the operation of circuit 46' may generally be understood with reference to the above description, recognizing that corresponding components of alternative circuit 46' are identified with generally corresponding reference numerals including a "prime" suffix ('). Circuit 46' includes power input conductors 48' in electrical communication with respective conductors of the power infeed cable 38a or 38b, electrical switch 50', a pair of power output conductors 52' that are in electrical communication with respective conductors of one of the power output cables 34a or 34b, a power sensor 54' coupled to power output conductors 52', and a logic controller 56' that is in communication with power sensor 54' and operable to selectively actuate switch 50', which defaults to an open condition as shown in FIG. 3B, and which is closed when an appropriate signal is sent via a signal line 68', an optical isolator 60', and a relay input conductor 62b'. Out-of-phase detector circuit 64' is configured to compare the electrical phase of power at power input conductors 48' with the electrical phase of any power present at power output conductors 52', and includes its own optical isolator 61' for sending an out-of-phase signal to logic controller 56' via a low voltage signal wire 69'.

Referring once again to FIG. 1, table legs 28 conceal branch wires 26a, 26b, and as shown in the enlarged portions of FIG. 1, table legs 28 may define storage cavities 72 for concealing at least a lower portion of a given branch wire 26a, 28a and the associated branch wire connector 30a, 30b when these components are not in use. The other components of each modular power system 12a, 12b may also be substantially concealed within tables 14a, 14b. For example, substantial portions of electrical power outlet units 20a, 20b, modular input wires 22a, 22b, modular output wires 24a, 24b may be concealed within a framework 74a, 74b or other structure located beneath a respective table top or work surface 76a, 76b. Electrical outlets associated with electrical power outlet units 20a, 20b may be accessible through openings formed in respective framework 74a, 74b, although it will be appreciated that the electrical power outlet units 20a, 20b may be mounted to the table top, table legs, or substantially anywhere that power access is desired, without departing from the spirit and scope of the present invention. Modular power in/out connectors 36a, 36b may also be substantially hidden or obscured by at least table tops 76a, 76b, while still being readily accessible when needed to connect jumper cable 16, or for establishing other electrical connections as desired.

Figure 2:
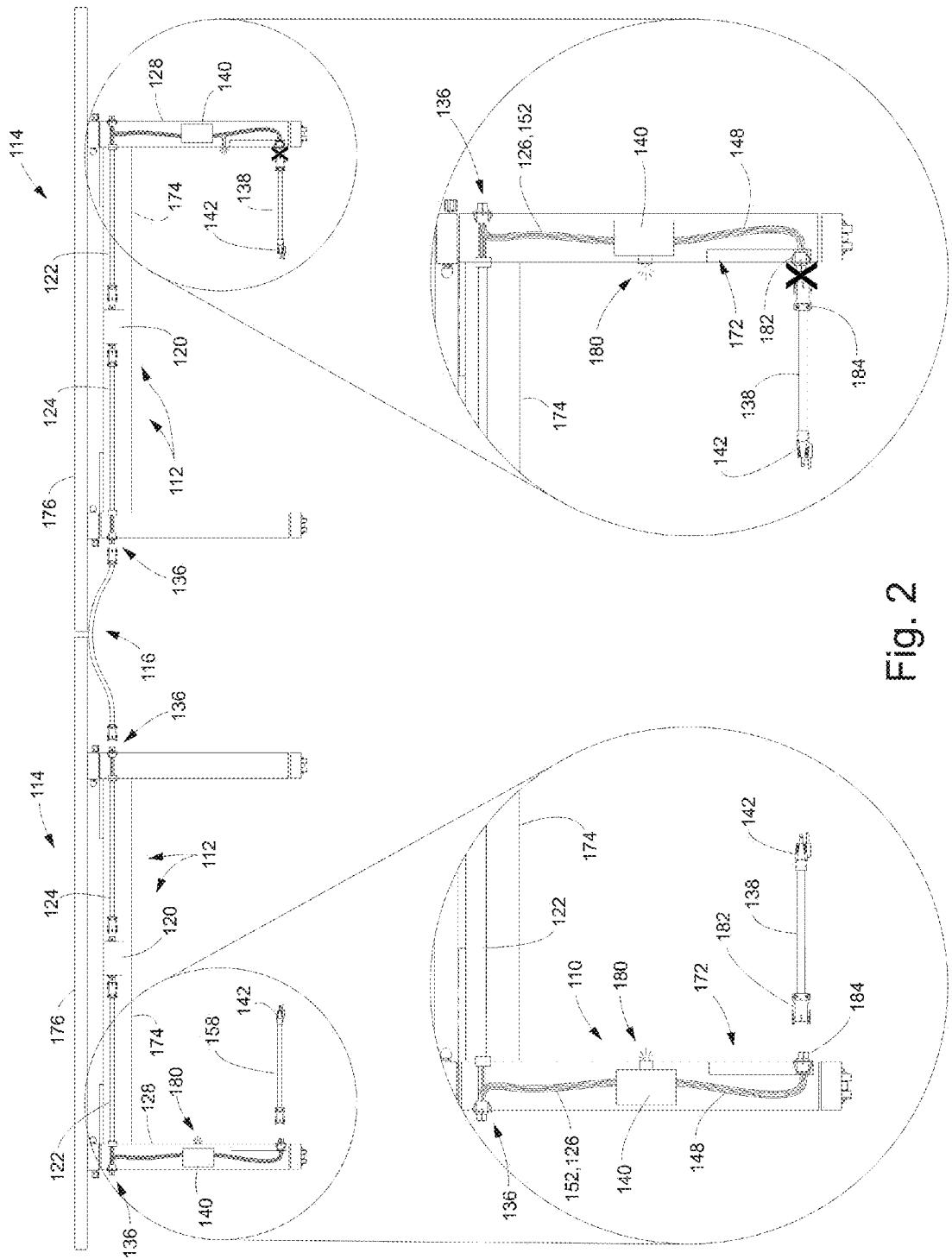
FIG. 2 is a diagrammatic side elevation of another pair of portable tables incorporating modular power systems with respective power infeed systems in accordance with the present invention, including enlarged views of portions thereof.

Optionally, an electrical power infeed system 110 may be more directly integrated or incorporated into a modular power system 112 and associated article of furniture 114, such as shown in FIG. 2, in which various components generally correspond to components found in power infeed systems 10a, 10b, modular power systems 12a, 12b, and tables 14a, 14b of FIG. 1, and are therefore assigned like numerals by the addition of 100, such that the components shown in FIG. 2 may be readily understood with reference to the above discussion. Power infeed system 110 includes an electrical circuit module 140 that is mounted in one of the table legs 128, and includes an indicator light 180 that is visible from outside of the table leg 128, such as through an opening formed in the leg for that purpose. Optionally, and as shown at upper-right in FIG. 2, the indicator light 180 may be located remotely from circuit module 140.

Circuit module 140 is essentially hard-wired in to what is described above as a branch wire 26, so that circuit module 140 travels with its respective table 114 and modular power system 112. In the illustrated embodiment of FIG. 2, the only readily-removable component is a power infeed cable 138 with its associated plug 142 and a connector 182 that is configured to releasably couple to a corresponding connector 184 mounted in or near a storage cavity 172 of table leg 128. Connector 184 is in communication with a power input conductor 148 that supplies power to electrical circuit module 140 and, under appropriate conditions, supplies power to the remainder of the modular power system or systems 112. Power infeed cable 138 may have substantially any desired length needed to reach an electrical power source, such as a wall outlet or a floor outlet.

Indicator light 180 provides one or more indications regarding the electrical power condition of the associated electrical circuit module 140, such as by using steady or pulsed light signals, different light colors, or the like. For example, indicator light 180 may signal one or more of the following conditions: (i) the associated electrical circuit module 140 has been coupled to a live outlet (power source) via power infeed cable 138, (ii) the associated electrical circuit module 140 is sending power to its associated modular power system 112, (iii) the associated electrical circuit module 140 is coupled to a live outlet (power source) via power infeed cable 138, but it is not sending power to its associated modular power system 112, (iv) the associated electrical circuit module 140 is detecting that its associated modular power system 112 is electrically energized by a downstream power source, and (v) an out-of-phase condition has been detected. It will be appreciated that multiple lights, audible tones, or other indicia may be used to advise users of the various different operating conditions of electrical circuit module 140, and that the indicia may be provided substantially anywhere along the electrical system and/or furniture articles with which it is associated.

As will be appreciated with reference to the above description, the electrical power infeed systems of the present invention are operable to prevent electrical conflicts that could be caused by electrically coupling two or more electrical power sources together. This is accomplished using a standard two-wire ("hot" or "line" and "neutral") or three-wire (i.e., including "ground") AC wiring arrangement, so that electrical power infeed systems 10, 110 are electrically compatible with substantially any modular power system because they do not rely on additional conductors (such as low voltage signal conductors) to detect the presence of multiple electrical power sources feeding into the same modular electrical system. The electrical circuit modules act as selective electrical isolators between a respective power source and the downstream modular electrical system, until it is confirmed that power is not already being supplied to the modular electrical system from another power source, so that only one power source is permitted to supply the entire "ganged" modular circuit, regardless of the number of different power infeeds that are coupled to separate power sources. Furniture or other articles that incorporate the modular electrical systems may be ganged together and arranged as desired in a given work area, and coupled to one or more electrical power sources, except that only the first-connected electrical power source will actually be permitted to supply the overall system with electrical power, because subsequently-connected electrical power sources will remain electrically isolated by the respective electrical circuit modules of the electrical power infeed systems.

Accordingly, the modular electrical power systems of the present invention, with intelligent electrical power infeed systems or units, provide users of a work area with numerous options to configure and relocate various types of furniture or articles incorporating respective modular electrical systems (or portions thereof), which may be coupled together in series, and which may be coupled to different power sources. Each electrical power infeed system detects whether its downstream wiring is already electrically energized from another source, and if so, that power infeed system will not permit the power source to which it is directly coupled to supply power to the downstream wiring. This limits or prevents the risks associated with electrically coupling two different electrical power sources together, and provides work area users with the ability to select and position desired portable articles (such as tables, desks, etc.) that incorporate the desired electrical outlets or other electrical components, and without relying on skilled technicians to make appropriate electrical connections. Thus, work areas incorporating the modular electrical power system with intelligent electrical power infeed units are quickly reconfigurable by moving furniture and establishing electrical connections as desired, to meet changing functional and electrical needs of the work area.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical power infeed module for selectively supplying electrical power to a modular electrical power system in a work area, said power infeed module comprising:
   one and only one power infeed cable, wherein said power infeed cable is configured to be electrically coupled to a first electrical power source;
   a power output cable having a proximal end and a free distal end opposite said proximal end, wherein said power output cable is in selective electrical communication with said power infeed cable;
   a sensor configured to detect whether said power output cable is electrically energized, wherein said sensor is in direct communication with said power output cable irrespective of whether said switch is open or closed;
   an electrical circuit disposed between said power infeed cable and said power output cable, wherein said electrical circuit is electrically energizable via only said power infeed cable, said electrical circuit comprising:
      a switch positioned at said proximal end of said power output cable and configured to selectively establish an electrical connection between said power infeed cable and said power output cable; and
      a controller operable to close said switch when said electrical circuit is energized by the first electrical power source and in response to a signal received from said sensor indicating that said power output cable is not already energized;
   wherein said electrical circuit is operable to (i) maintain said power infeed cable and said power output cable in electrical isolation from one another when said power output cable is electrically energized by a second electrical power source before said power infeed cable is electrically energized by the first electrical power source, and (ii) electrically couple said power infeed cable to said power output cable via said switch when said power output cable is not electrically energized and said power infeed cable is electrically energized by the first electrical power source.

2. The power infeed module of claim 1, wherein said power infeed cable comprises at least two AC infeed conductors and said power output cable comprises at least two AC output conductors, and wherein said switch is configured to selectively establish an electrical connection between at least one of said AC infeed conductors and at least one of said AC output conductors.

3. The power infeed module of claim 2, wherein said power infeed cable comprises an electrical plug configured to engage and electrically couple said at least two AC infeed conductors to the first electrical power source.

4. The power infeed module of claim 2, wherein said power output cable has continuous electrical continuity between said proximal end and said free distal end, and comprises an electrical connector at said free distal end, wherein said electrical connector is configured to engage and electrically couple to a power cable associated with an other electrical power infeed module that is in electrical communication with the second electrical power source.

5. The power infeed module of claim 4, further in combination with said other electrical power infeed module, and further comprising a jumper cable disposed between said power output cable of said power infeed module and said other power infeed module.

6. The power infeed module of claim 1, further comprising an electrical outlet in electrical communication with said power output cable, wherein said electrical outlet is configured to receive an electrical plug of an electrical consumer, and wherein said electrical outlet is electrically energized when either of (i) said power infeed cable is electrically coupled to said power output cable via said switch and power infeed cable is electrically energized by the first electrical power source, or (ii) said power output cable is electrically de-coupled from said power infeed cable at said switch and said power output cable is electrically energized by the second electrical power source.

7. The power infeed module of claim 6, further in combination with an other electrical power infeed module that is in electrical communication with said power output cable and the second electrical power source.

8. The power infeed module of claim 1, wherein said switch comprises one chosen from: (i) a dual-pole relay, and (ii) two single-pole relays.

9. The power infeed module of claim 1, further comprising at least one optical isolator associated with said sensor, said optical isolator configured to electrically isolate said controller from said power output cable.

10. The power infeed module of claim 9, further comprising a second optical isolator associated with said switch, said second optical isolator configured to electrically isolate said controller from said power infeed cable.

11. An electrical power infeed module for selectively supplying electrical power to a modular electrical power system in a work area, said power infeed module comprising:
- a power infeed cable configured to be electrically coupled to a first electrical power source;
- a power output cable that is in selective electrical communication with said power infeed cable;
- an electrical circuit disposed between said power infeed cable and said power output cable, said electrical circuit comprising:
  - a switch configured to selectively establish an electrical connection between said power infeed cable and said power output cable;
  - a sensor configured to detect whether said power output cable is electrically energized; and
  - a controller operable to close said switch when said electrical circuit is energized by the first electrical power source and in response to a signal received from said sensor indicating that said power output cable is not already energized;
- wherein said electrical circuit is operable to (i) maintain said power infeed cable and said power output cable in electrical isolation from one another when said power output cable is electrically energized by a second electrical power source before said power infeed cable is electrically energized by the first electrical power source, and (ii) electrically couple said power infeed cable to said power output cable via said switch when said power output cable is not electrically energized and said power infeed cable is electrically energized by the first electrical power source; and
- an out-of-phase detector circuit, wherein said controller is operable to close said switch when said electrical circuit is energized by the first electrical power source and in response to a signal received from said out-of-phase detector circuit indicating that said power output cable is not already energized by the second electrical power source having a different phase than the first electrical power source.

12. The power infeed module of claim 1, wherein said controller comprises a random time-delay, wherein said controller is operable to close said switch at a randomly-selected elapsed time following said electrical circuit being energized by the first electrical power source and the signal being received from said sensor indicating that said power output cable is not already energized.

13. A modular electrical power system with intelligent electrical power infeed for use in a work area, said system comprising:
- an electrical power outlet;
- a power infeed module comprising (i) one and only one power infeed cable, wherein said power infeed cable is configured to be electrically coupled to a first electrical power source, (ii) a power output cable that is in selective electrical communication with said power infeed cable, and (iii) an electrical circuit disposed between said power infeed cable and said power output cable, wherein said power infeed module is configured to selectively convey electrical power received from only said power infeed cable to said power output cable and said electrical power outlet;
- an electrical connector and electrical wiring in electrical communication with said electrical power outlet and with said power output cable of said power infeed module, said electrical connector configured to electrically couple said modular electrical power system to another modular electrical power system;
- a sensor in direct electrical communication with said power output cable irrespective of whether said switch is open or closed, wherein said sensor is configured to detect whether said power output cable is electrically energized when said switch is open;
- said electrical circuit comprising:
  - a switch configured to selectively establish an electrical connection between said power infeed cable and said power output cable, wherein said electrical circuit is electrically energizable via only said power infeed cable; and
  - a logic controller that is operable to close said switch in response to a signal received from said sensor indicating that said power output cable is not energized;
- wherein said power infeed module is operable to maintain said power infeed cable and said power output cable in electrical isolation from one another when said electrical power outlet cable is electrically energized by a second electrical power source.

14. The modular electrical power system of claim 13, further in combination with first and second movable articles in a work area, said first movable article having a first of said modular electrical power systems mounted thereto, and said second movable article having a second of said modular electrical power systems mounted thereto, wherein said power infeed cable of said second modular electrical power system is configured to be electrically coupled to the second electrical power source.

15. The modular electrical power system of claim 14, further comprising a jumper cable disposed between said power output cable of said first modular electrical power system and said power output cable of said second modular electrical power system.

16. A method of selectively energizing a modular electrical system that is connectable to at least two electrical power sources, said method comprising:
- connecting a first power infeed cable of a power infeed module to a first electrical power source, wherein the power infeed module further includes a first power output cable and an electrical circuit disposed between the first power infeed cable and the first power output cable, wherein the electrical circuit is electrically energizable via only the first power infeed cable;
- initially electrically isolating the first power output cable from the first power infeed cable with a switch of the electrical circuit;
- detecting, with a sensor when the switch is open, whether the first power output cable is electrically energized by a second electrical power source, wherein the sensor is in direct communication with the first power output cable irrespective of whether the switch is open or closed;

only when the first power output cable is electrically energized by the second electrical power source, sending a signal from the sensor to a controller, wherein the signal is indicative that the first power output cable is electrically energized by the second electrical power source; and only closing the switch with the controller to thereby energize the first power output cable via the switch and the first electrical power source in response to the signal being a no-signal condition from the sensor when the first power infeed cable is energized, wherein the no-signal condition is indicative of the first power output cable not being electrically energized.

17. The method of claim 16, further comprising:

connecting a second power infeed cable of a second power infeed module to the second electrical power source, wherein the second power infeed module further includes a second power output cable that is connected to the first power output cable, and a second electrical circuit disposed between the second power infeed cable and the second power output cable, wherein the second electrical circuit is electrically energizable via only the second power infeed cable;

initially electrically isolating the second power output cable from the second power infeed cable with a second switch of the second electrical circuit;

detecting, with a second sensor when the second switch is open, whether the second power output cable is electrically energized by the first electrical power source;

sending a second signal from the second sensor to a second controller, wherein the second signal is indicative of whether the second power output cable is electrically energized by the first electrical power source; and maintaining the second switch in an open condition in response to the second signal being indicative of the second power output cable being electrically energized.

18. The method of claim 16, wherein the second electrical power source is on a different electrical circuit than the first electrical power source.

19. The method of claim 18, further comprising closing the switch with the controller when the electrical circuit is energized by the first electrical power source and in response to a signal received from an out-of-phase detector circuit indicating that the first power output cable is not already energized by the second electrical power source having a different phase than the first electrical power source.

20. The power infeed module of claim 1, further comprising an out-of-phase detector circuit, wherein said controller is operable to close said switch when said electrical circuit is energized by the first electrical power source and in response to a signal received from said out-of-phase detector circuit indicating that said power output cable is not already energized by the second electrical power source having a different phase than the first electrical power source.

* * * * *

UNITED STATES PATENT AND TRADEMARK OFFICE
CERTIFICATE OF CORRECTION

| | |
|---|---|
| PATENT NO. | : 10,008,850 B2 |
| APPLICATION NO. | : 14/636273 |
| DATED | : June 26, 2018 |
| INVENTOR(S) | : Norman R. Byrne, Roger D. Burdi and Timothy J. Warwick |

It is certified that error appears in the above-identified patent and that said Letters Patent is hereby corrected as shown below:

In the Claims

Column 13 Lines 12-13, Claim 16:
Delete "the signal being".

Signed and Sealed this
Eighteenth Day of June, 2019

Andrei Iancu
*Director of the United States Patent and Trademark Office*